US012226794B2

(12) United States Patent
Pidan et al.

(10) Patent No.: US 12,226,794 B2
(45) Date of Patent: Feb. 18, 2025

(54) SPREADING UNIT WITH ADJUSTABLE SHAPER

(71) Applicant: Broetje-Automation GmbH, Rastede (DE)

(72) Inventors: Sergej Pidan, Winnenden (DE); Kay Rupp, Stuttgart (DE); Christoph Schneider, Stuttgart (DE)

(73) Assignee: Broetje-Automation GmbH, Rastede (DE)

( * ) Notice: Subject to any disclaimer, the term of this patent is extended or adjusted under 35 U.S.C. 154(b) by 0 days.

(21) Appl. No.: 17/964,565

(22) Filed: Oct. 12, 2022

(65) Prior Publication Data

US 2023/0173531 A1 Jun. 8, 2023

Related U.S. Application Data

(63) Continuation of application No. 16/338,828, filed as application No. PCT/EP2017/068981 on Jul. 27, 2017, now abandoned.

(30) Foreign Application Priority Data

Oct. 2, 2016 (DE) ..................... 10 2016 118 693.7

(51) Int. Cl.
*B05C 11/02* (2006.01)
*B05C 5/02* (2006.01)
(Continued)

(52) U.S. Cl.
CPC .......... *B05C 11/042* (2013.01); *B05C 5/0216* (2013.01); *B05C 11/023* (2013.01);
(Continued)

(58) Field of Classification Search
None
See application file for complete search history.

(56) References Cited

U.S. PATENT DOCUMENTS

| | | | | |
|---|---|---|---|---|
| 4,145,173 A | | 3/1979 | Pelzer et al. | |
| 5,273,704 A | * | 12/1993 | Scholl | B29C 48/302 264/254 |

(Continued)

FOREIGN PATENT DOCUMENTS

| | | |
|---|---|---|
| EP | 2896463 | 7/2015 |
| EP | 3072598 | 9/2016 |

(Continued)

OTHER PUBLICATIONS

"Final Office Action," for U.S. Appl. No. 16/338,828 mailed May 12, 2022 (8 pages).

(Continued)

*Primary Examiner* — Binu Thomas
(74) *Attorney, Agent, or Firm* — Pauly, DeVries Smith & Deffner LLC

(57) ABSTRACT

The disclosure relates to a spreading unit having a shaper for spreading viscous material, in particular sealing material, on a component, wherein the shaper has a first shaping contour for shaping the viscous material in the process of the spreading, wherein at least a second shaping contour of the shaper for shaping the viscous material can be brought by means of an actuator, in a direction of spreading, into superimposition with the first shaping contour, so that a shape of the shaper is adjustable during an application process.

11 Claims, 7 Drawing Sheets

(51) Int. Cl.
*B05C 11/04* (2006.01)
*B05C 17/005* (2006.01)

(52) U.S. Cl.
CPC .......... *B05C 11/041* (2013.01); *B05C 11/045* (2013.01); *B05C 17/00516* (2013.01)

(56) References Cited

U.S. PATENT DOCUMENTS

| | | | |
|---|---|---|---|
| 2014/0154485 A1 | 6/2014 | Traser et al. | |
| 2015/0343487 A1 | 12/2015 | Davancens et al. | |
| 2016/0271629 A1 | 9/2016 | Pringle et al. | |
| 2018/0369855 A1 | 12/2018 | Pidan et al. | |
| 2021/0283644 A1 | 9/2021 | Pidan et al. | |

FOREIGN PATENT DOCUMENTS

| | | |
|---|---|---|
| JP | H03109673 | 11/1991 |
| JP | 2002248406 | 9/2002 |
| JP | 2002248406 A * | 9/2002 |
| JP | 2010258142 | 11/2010 |
| JP | 2014057638 | 4/2014 |
| JP | 2016107190 | 6/2016 |
| WO | 2018059792 | 4/2018 |

OTHER PUBLICATIONS

"German Seach Report," for German Patent Application No. 102016118693.7 mailed May 5, 2017 (10 pages).
"International Preliminary Report on Patentability," for PCT Application No. PCT/EP2017/068981 mailed Apr. 11, 2019 (9 pages). English Translation.
"International Search Report and Written Opinion," for PCT Application No. PCT/EP2017/068981 mailed Oct. 11, 2017 (20 pages) with English translation.
"Non-Final Office Action," for U.S. Appl. No. 16/338,828 mailed Nov. 15, 2021 (16 pages).
"Response to Non-Final Rejection," mailed on Nov. 15, 2021 for U.S. Appl. No. 16/338,828, submitted via EFS-Web on Apr. 15, 2022, 8 pages.

* cited by examiner

SPREADING UNIT WITH ADJUSTABLE SHAPER

CROSS-REFERENCE TO RELATED APPLICATIONS

This application is a continuation application of prior U.S. application Ser. No. 16/338,828 filed Apr. 2, 2019, which is a national stage application under 35 U.S.C. 371 of International Patent Application Serial No. PCT/EP2017/068981, entitled "Spreading Unit," filed Jul. 27, 2017, which claims priority from German Patent Application No. DE 10 2016 118 693.7, filed Oct. 2, 2016, the disclosures of which are incorporated herein by reference.

FIELD OF THE TECHNOLOGY

The disclosure relates to a spreading unit for spreading viscous material, a system for spreading viscous material, and a method for spreading a viscous material.

BACKGROUND

For the application of viscous material, in particular sealing material such as, for instance, aircraft sealing compounds or silicone-like sealing material, various application units are known. For instance, in EP 2 896 463 A1 a shaping nozzle for applying and shaping a seal weld on a component is described. With a nozzle, respectively only one weld with a nozzle-specific shape can in this case be formed.

In addition, in Japanese printed publication JP 2014-057638 A a spreading unit for the application and spreading of sealing material is described. This spreading unit has two brush portions, which, for the bridging of offsets in a component, can be manually adjusted relative to one another. Two portions of different height can herewith be surface-treated across a projection. For the adjustment, the spreading process has to be interrupted. In addition, a continuous adaptation of the spreading unit to varying component surfaces is not possible.

SUMMARY

The disclosure is based on the problem of designing and refining a known spreading unit such that viscous material can be spread in a simple and flexible manner on a component.

This object is achieved by a spreading unit having the features as described herein.

Through the provision of a second shaping contour, an adjustable shape or contour can overall be provided in order to meet altered requirements concerning the length of a material application. Thus, the start and/or end of an applied web of a sealing material, for example, can be shaped in a controlled manner. A clean and repeatable shape at the start and end of the web is hence able to be achieved. Right at the end of the web, given an invariable shape of the shaper, a stringing of a sealing material, and/or undercuts, frequently materialize following a reduction of the material flow.

A shaping contour here generally comprises a purposefully shaped boundary, which comes partially or fully into contact with the applied material and effects a reshaping or a shape-forming spreading of the material.

In the case of the present disclosure, the shape of the shaper is obtained, in particular, by superimposition of the two shaping contours. This corresponds to a geometric overlap of the shaping contours in the direction of application or direction of spreading.

Normally, a free cross-section of the first shaping contour is therefore reduced by the superimposition with the second shaping contour, or the resulting adjustable shape is derived from the intersection of the free cross-sections of the two shaping contours in their respective position.

By an actuator is generally understood any motorized element for automatically adjusting at least the second shaping contour. Examples are piezo actuators, electric linear drives, pneumatic linear drives, or similar. In some embodiments, the second shaping contour can be adjusted, at least in one direction, in a controlled and stepless manner in terms of its position relative to the first shaping contour.

In general, it is advantageously provided that the second shaping contour has an outline which substantially corresponds to a cross-section of the component in the region of the spreading. As a result, the applied material can be largely or completely scraped off by contact of the second shaping contour with the component, whereby particularly well shaped start regions and end regions are formed. Where necessary, also portions of an otherwise continuous material web can be neatly spared a material application.

In some embodiments, it is provided that the second shaping contour comprises at least two contour segments which are separately movable relative to one another, wherein the contour segments are arranged side by side, in particular transversely to the direction of spreading. This allows an improved guidance, in particular along stepped edges of variable height. In the interest of a simple and effective structural realization, it can here be provided that one of the separately movable contour segments is movable in a resiliently elastic manner in relation to the other of the contour segments.

Various advantages of the disclosure can be used to particularly good effect if the component is a structural component of an aircraft. In some embodiments, with the component, one or more materials from the group aluminium alloy, composite fibre material and/or titanium are covered.

In some embodiments if the viscous material is applied to a joint weld of the component, wherein the joint weld is configured, in particular, as a stepped weld or a fillet weld.

For the controlled creation of a neatly shaped start region of the viscous material, it is advantageously provided that the second shaping contour at least partially superimposes the first shaping contour at least at the beginning of a material application, wherein the second shaping contour is moved back during the application of a start region.

For the controlled creation of a neatly shaped end region of the viscous material, it is advantageously provided that the second shaping contour at least predominantly clears the first shaping contour during a continuous material application, wherein the second shaping contour, during the application of an end region, is brought into superimposition with the first shaping contour.

It is generally advantageous if the spreading unit has a nozzle for the application of the viscous material, such as the sealing material, on the component. The nozzle can in particular be structurally combined with the shaping contours and, at the same time, be moved with the shaping contours. In some embodiments, the nozzle and the shaper have a fixed distance apart. In this way, for instance in the drawing of welds with the viscous material, a uniform drying and/or hardening of the viscous material from the moment of discharge from the nozzle to the shaping by the shaping contours can be obtained. The weld quality is hereby able to be enhanced in a simple manner.

For the accurate position control of the spreading unit in relation to the component, the spreading unit can have a sensor, such as a line laser, for detecting that region of the component that is to be coated. With the aid of the sensor, a joint, for instance, which is due to be coated with the viscous material can be detected. In addition, a volume flow and/or mass flow which is required, for instance, to fill the joint is determinable.

The viscous material can be constituted, in particular, by a sealing material, in particular an aircraft sealing compound or a silicone-like sealing material. The component can be an assembly of parts, and the viscous material can be spread along a joint of the parts of the assembly.

The spreading of the viscous material can be realized by a movement of the component and/or by a movement of the spreading unit in the direction of spreading. With a view to a flexible and an at least partially automated production, it has proved advantageous if the spreading unit is configured as an end effector for a manipulator, such as, for instance, a gantry machine and/or an industrial robot.

In addition, the above-stated object is achieved by a system having the features as described herein. The same advantages can be obtained as previously described in connection with the spreading unit.

According to various embodiments, the above-stated object is achieved, with regard to the method, by the features described herein.

The same advantages can be obtained as previously described in connection with the spreading unit and with the system for spreading viscous material. In some embodiments, the viscous material is spread in an automated manner.

In a first application method, it is provided that, in step a or in step b, respectively a start region or an end region of the viscous material is applied. The variable shape of the shaper is herein utilized for the controlled shaping of the start and end regions, whilst avoiding stringing or the formation of undercuts.

In an alternative or supplementary method, it is provided that the viscous material is applied in step a and in step b, one above the other, onto the same region of the component. This allows two application steps by means of the same nozzle. A first, smaller weld can here, for example, firstly be applied by means of the second shaping contour in order to ensure the filling of a corner of the component. Expediently, the shape of the first weld is here shaped in the second shaping contour. After this, a larger, second weld is then applied by means of the first shaping contour. The second weld can, in particular, completely superimpose the first weld. Expediently, it is applied in good time before the first weld sets. Even in just such a multi-stage application of the material, a controlled shaping of the start and/or end regions can be provided, moreover, by the relative movement of the shaping contours.

The method can comprise that a sensor, such as a line laser, registers that region of the component that is to be coated and the sensor data are analysed by a control system. In some embodiments, by means of the control system, the shape of the shaper is controlled and/or regulated in dependence on the sensor data.

It can here be provided that the control system, in dependence on the sensor data, controls and/or regulates the relative movement between the component and the spreading unit.

Alternatively or additionally, it can be provided that, by the control system, the volume flow and/or mass flow of viscous material through a nozzle onto the region to be coated is regulated and/or controlled in dependence on the sensor data.

Alternatively or additionally, it can be provided that, with the spreading of the viscous material, a weld is created. In some embodiments, the cross-section at the start and/or end of the weld is reduced by a change in position of the second shaping contour. In some embodiments, in the process of the spreading, a change in the cross-section of the weld is continuously realized through the change in position.

Further advantages and features emerge from the below-described illustrative embodiments.

Various embodiments provide a spreading unit having a shaper for spreading viscous material, in particular sealing material, on a component, wherein the shaper has a first shaping contour for shaping the viscous material in the process of the spreading, wherein at least a second shaping contour of the shaper for shaping the viscous material can be brought by means of an actuator, in a direction of spreading, into superimposition with the first shaping contour, so that a shape of the shaper is adjustable during an application process.

In some embodiments, the second shaping contour has a course which substantially corresponds to a cross-section of the component in the region of the spreading.

In some embodiments, the second shaping contour comprises at least two contour segments which are separately movable relative to one another, wherein the contour segments are arranged side by side, in particular transversely to the direction of spreading.

In some embodiments, one of the separately movable contour segments is movable in a resiliently elastic manner in relation to the other of the contour segments.

In some embodiments, the component is a structural component of an aircraft, in particular comprising one or more materials from the group aluminium alloy, composite fibre material and/or titanium.

In some embodiments, the viscous material is applied to a joint weld of the component, wherein the joint weld is configured, in particular, as a stepped weld or a fillet weld.

In some embodiments, the second shaping contour at least partially superimposes the first shaping contour at least at the beginning of a material application, wherein the second shaping contour is moved back during the application of a start region.

In some embodiments, the second shaping contour at least predominantly opens up the first shaping contour during a continuous material application, wherein the second shaping contour, during the application of an end region, is brought into superimposition with the first shaping contour.

In some embodiments, the spreading unit has a nozzle for the application of the viscous material, in particular the sealing material, on the component.

In some embodiments, the spreading unit has a sensor, in particular a line laser, for detecting that region of the component that is to be coated.

Various embodiments provide a system for spreading viscous material on a component, wherein the system has a component holder for receiving a component, wherein the system has a spreading unit according to the disclosure.

In some embodiments, the system has a manipulator with the spreading unit as the end effector.

Various embodiments provide a method for spreading a viscous material on a component by means of a spreading unit according to the disclosure. The method can include application of the viscous material to the component in a first position of the shaping contours relative to one another; and application of the viscous material to the component in a second position of the shaping contours relative to one another.

In some embodiments, in one of the steps, respectively a start region or an end region of the viscous material is applied.

In some embodiments, the viscous material is applied in both steps, one above the other, onto the same region of the component.

BRIEF DESCRIPTION OF THE DRAWINGS

Below, several illustrative embodiments are described, and explained in greater detail with reference to the accompanying drawings, wherein.

DETAILED DESCRIPTION

Figure 1:
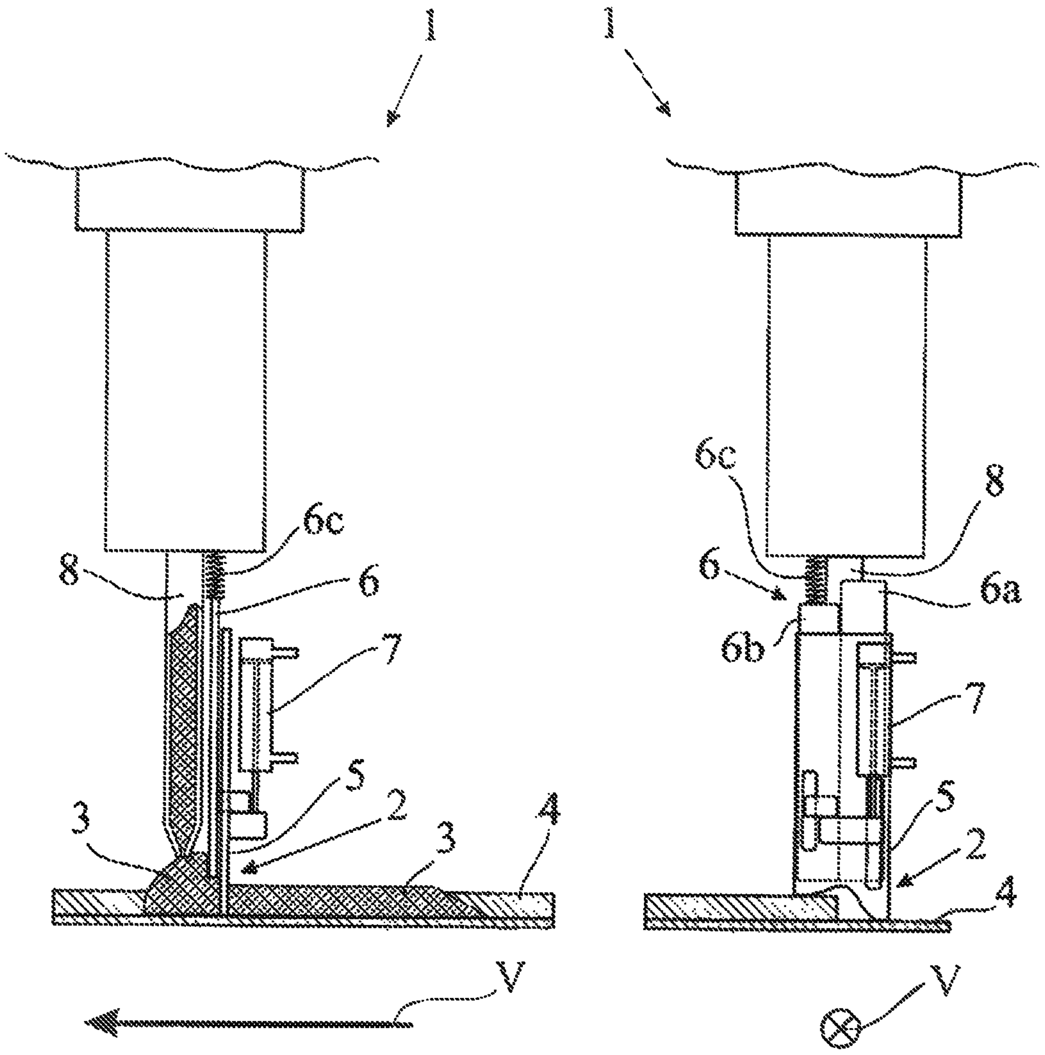
FIG. 1 shows a spreading unit of a first embodiment in lateral and in in frontal view.

FIG. 1 shows a spreading unit 1 having a shaper 2, for spreading viscous material 3 on a component 4.

The shaper 2 has a first shaping contour 5 and a second shaping contour 6 for shaping the viscous material 3 in the process of the spreading. The viscous material 3 is here constituted by a sealing material, in particular an aircraft sealing compound or a silicone-like sealing material. The component 4 can in particular be an assembly, such as an aircraft structure component and/or a motor vehicle part, in particular a body structure component.

As can be seen in FIG. 1, for the application of the viscous material 3 on the component the spreading unit 1 can have a nozzle 8. The nozzle 8 can be arranged, in the direction of relative movement of the spreading unit 1 relative to the component 4, before the shaper 2.

In some embodiments, the nozzle 8 can be arranged at a predefined fixed distance from the shaper 2. A robust spreading process can hereby be ensured since the viscous material 3 can precompact or partially harden in a predefined manner on the path from the nozzle 8 to the shaper 2. In the case of a compressible viscous material 3, the viscous material 3 can hereby stretch and/or slacken prior to the shaping. The distance between the nozzle 8 and the shaper 2 can be maximally 5 cm, further maximally 3 cm, further maximally 1 cm.

The shaping contours 5, 6 are arranged directly one behind the other in a direction of application or spreading V. The first shaping contour 5 here lies behind the second shaping contour 6 in the direction of spreading V and is arranged at a fixed distance relative to the nozzle 8.

The second shaping contour 6 is movable relative to the first shaping contour 5 by means of an actuator 7 in the form of a pneumatic cylinder or servo motor. The movement is realized perpendicular to the direction of spreading V towards the component 4 or away from the component 4.

In the case of the first illustrative embodiment, the second shaping contour 6 comprises, moreover, two contour segments 6*a*, 6*b*, which are separately movable relative to one another and are arranged side by side transversely to the direction of spreading V. One of the contour segments 6*a* is here directly connected to the actuator 7, wherein the other of the contour segments 6*b* is guided in a separately movable manner on the first contour segment 6*a*. Via a spring 6*c*, the second contour segment 6*b* is biased, so that it is at all times advanced up to a stop on the first contour segment 6*a* insofar as it does not bear against the component 4 and is hereby moved in relation to the first contour segment 6*a* out of the stop position.

Such an arrangement is in particular advantageous in respect of that stepped weld of the component that is shown in the first illustrative embodiment. The second contour segment can here rest on the top edge of the step and completely scrape off the viscous material there while the second contour segment is purposefully adjusted.

Figure 2:
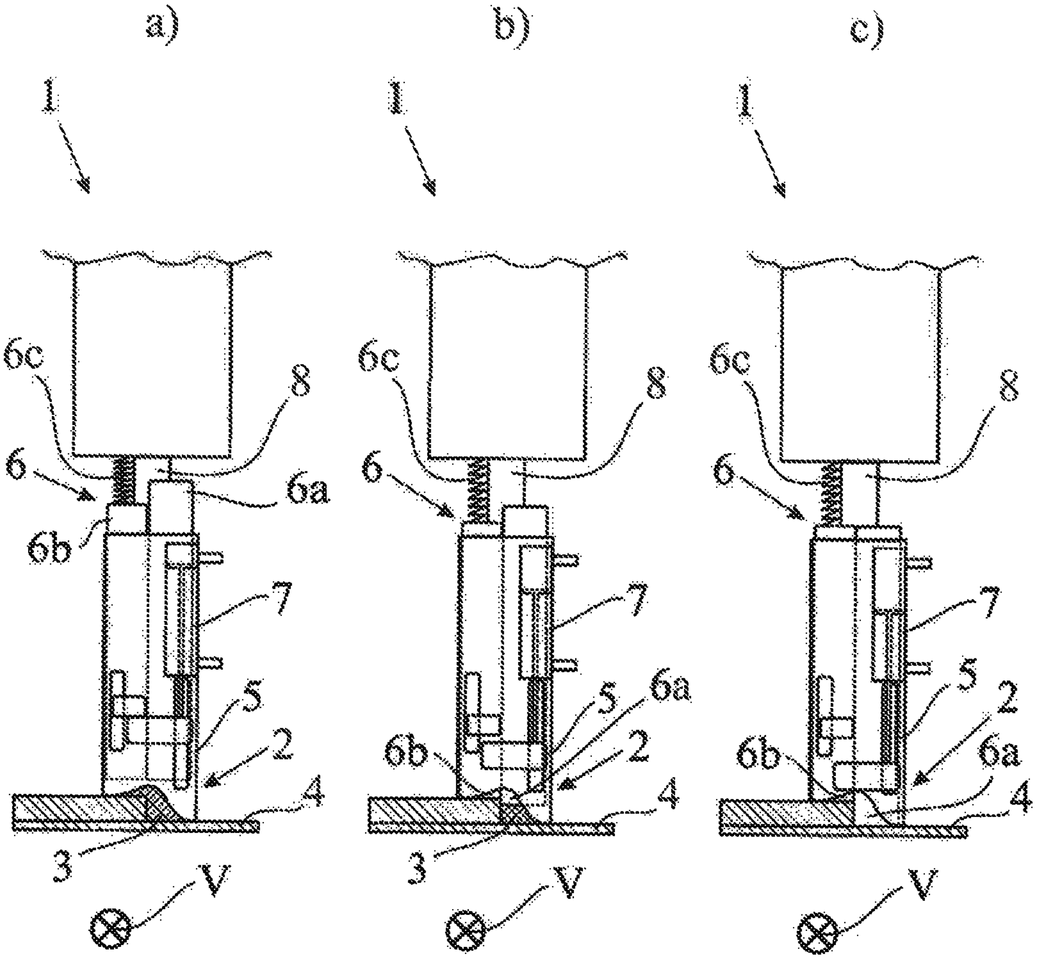
FIG. 2 shows the spreading unit from FIG. 1 in three different positions of shaping contours.

FIG. 2 shows the spreading unit 1 in three different positions of the second shaping contour 6. In the left-hand diagram, the second shaping contour 6 is fully retracted and the cross-sectional shape of the applied viscous material is fully determined by the first shaping contour 5. In the middle diagram, the second shaping contour 6 is partially advanced, so that the second contour portion 6*b* already rests on the upper edge of the component step and there prevents the material application. The first contour portion 6*a* permits in the lower region of the component step a further, height-reduced material application. In the right-hand diagram, the second shaping contour 6 is maximally advanced and completely superimposes the first shaping contour 5.

Furthermore, the spreading unit 1 here has a sensor (not represented) for detecting the region to be coated, such as a joint of the component 4. The sensor is here arranged, in the direction of relative movement, before the nozzle 8 and/or the shaper 2. In the process of the spreading, it here runs ahead of the nozzle 8 and/or the shaper 2. In some embodiments, the sensor is configured as an optical sensor, in particular a line laser. With a line laser, a reliable detection of the relevant joint is enabled.

Here, the sensor registers a region to be coated of the component 4. A control system analyses the resulting sensor data. In some embodiments, by means of the control system, the shaping contours of the shaper 2 are controlled and/or regulated in dependence on the sensor data. Additionally or alternatively, the control system can control and/or regulate the relative movement between the component 4 and the spreading unit 1 in dependence on the sensor data. By combining the controlling of the relative movement and of the shaping contours, the weld quality can be enhanced. For instance, motional deviations of a manipulator bearing the spreading unit can in this way be compensated by an adjustment of the shaping contour.

Additionally or alternatively, the control system can control and/or regulate the relative movement between the component 4 and the spreading unit 1 in dependence on the sensor data. That relative movement between component 4 and shaper 2 which is necessary for the spreading can here be generated in different ways. For instance, the spreading unit 1 can be configured as an end effector, for example of an industrial robot, and be moved relative to the component 4. Additionally or alternatively, the component 4 can be moved relative to the shaper 2. For instance, the component 4 can be received in a component holder, which can in turn be moved relative to the shaper 2.

According to a further embodiment, it can be provided that the control system, in dependence on the sensor data, regulates and/or controls the volume flow and/or mass flow of viscous material through the nozzle 8 onto the region to be coated.

Figure 3:
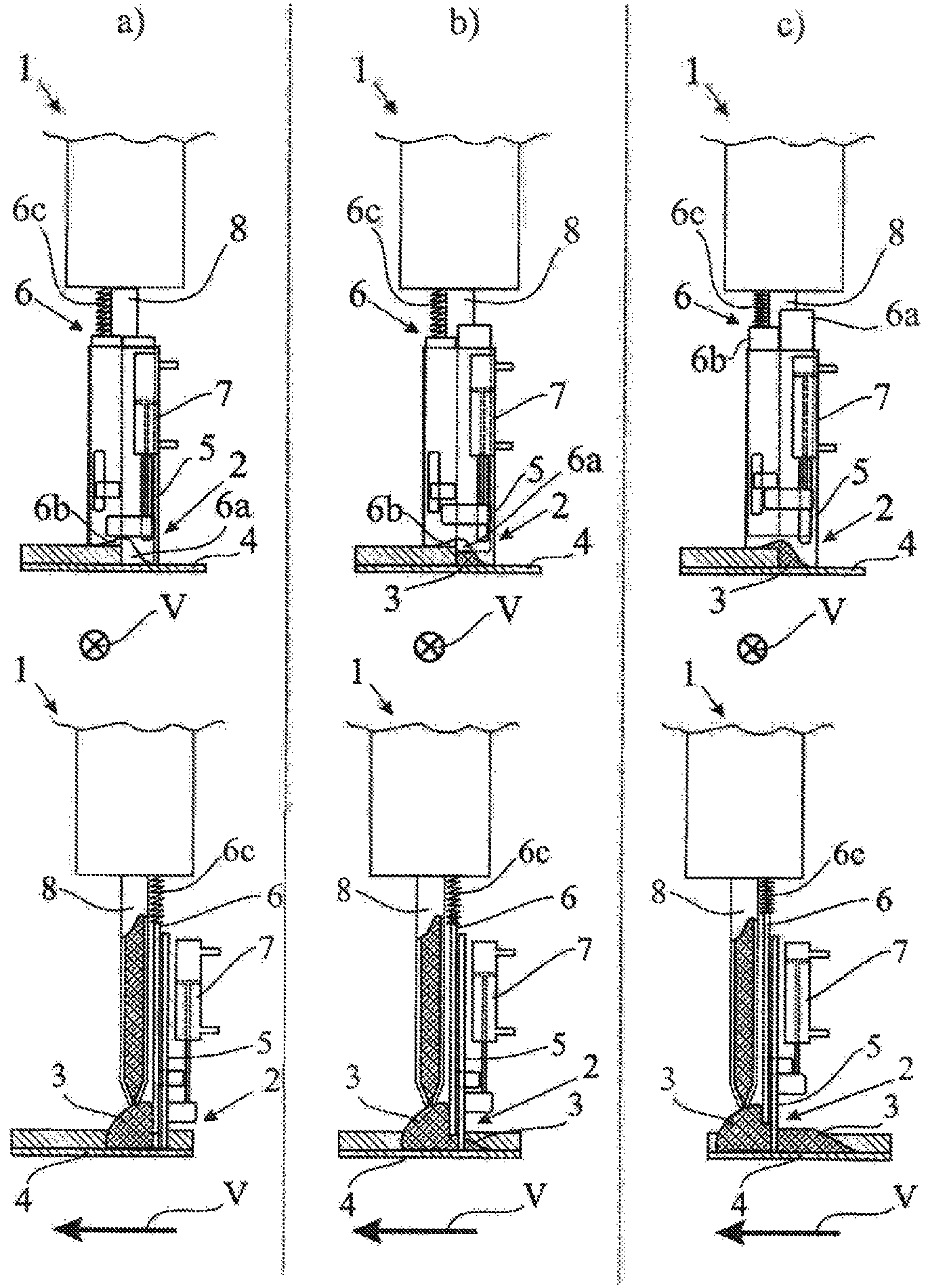
FIG. 3 shows the spreading unit from FIG. 1 in several method steps for the formation of a start region of a weld.

The disclosure according to the first illustrative embodiment now functions as follows:

According to the representations in FIG. 3, a start region of the weld can be shaped in a controlled manner by firstly the second shaping contour 6 being maximally advanced and fully covering the first shaping contour 5 (FIG. 3*a*). Next, a dispensing of the viscous material from the nozzle 8 is commenced and the spreading unit 1 is moved in the direction of spreading V. The second shaping contour 6 is then transported continuously upwards, so that increasingly material is applied with increasing thickness in the lower region of the component step (FIG. 3*b*). Finally, according to FIG. 3*c*, the second shaping contour is fully retracted, so that only the first shaping contour determines the cross-section of the applied material. This is a quasi-stationary state, in which an optionally long middle region of the weld is applied.

Figure 4:
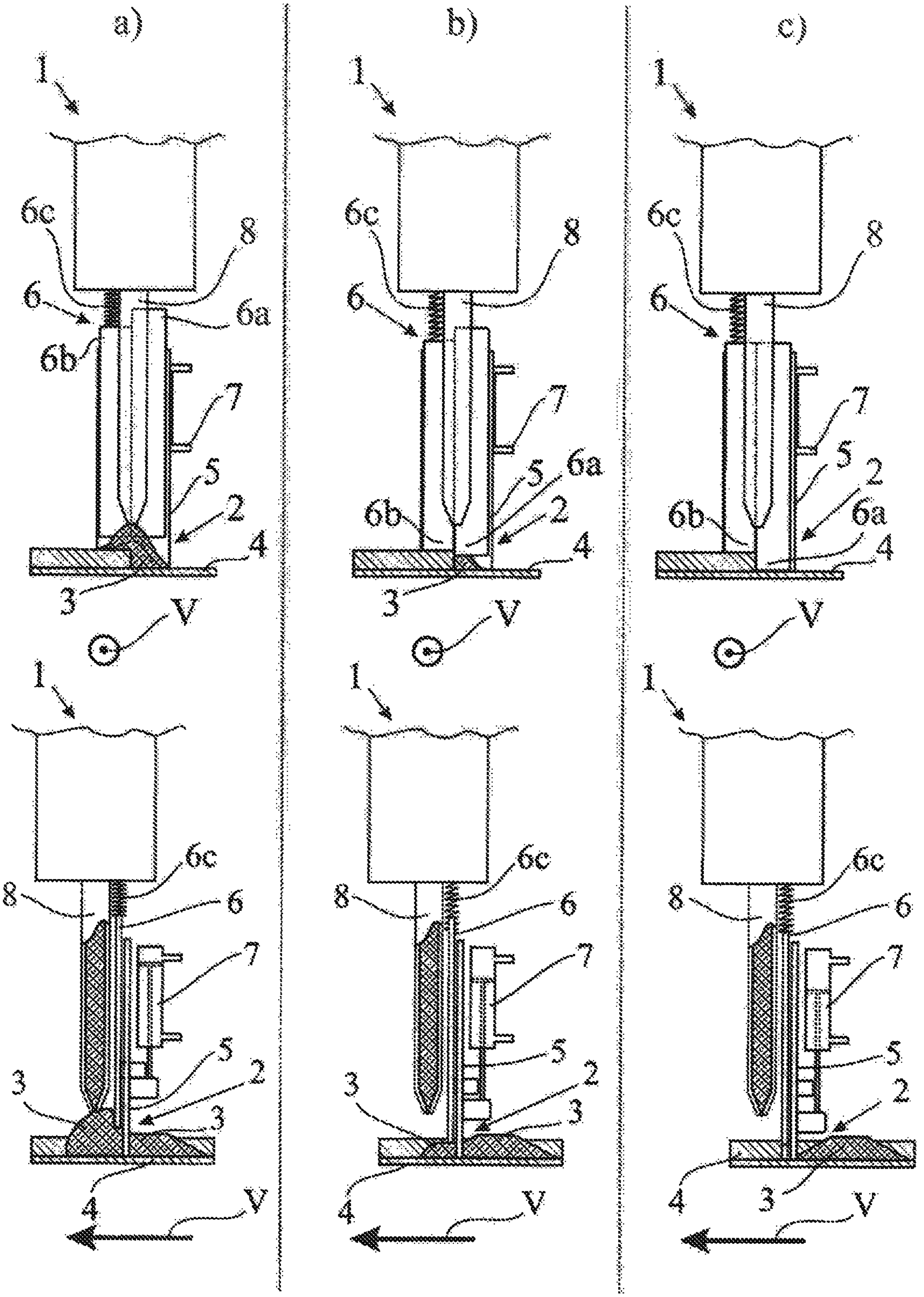
FIG. 4 shows the spreading unit from FIG. 1 in several method steps for the formation of an end region of a weld.

According to the representations in FIG. 4, an end region of the weld can be shaped in a controlled manner by firstly the second shaping contour 6 being maximally retracted and the aforementioned middle region of the weld being coated (FIG. 4*a*). Next, the second shaping contour 6 is transported continuously downwards, so that the cross-section is increasingly limited (FIG. 4*b*). Finally, according to the right-hand diagram, the second shaping contour is pushed fully against the component 4, so that all material is scraped off (FIG. 4*c*). Once or shortly before this state is reached, the material flow from the nozzle 8 is expediently halted.

Figure 5:
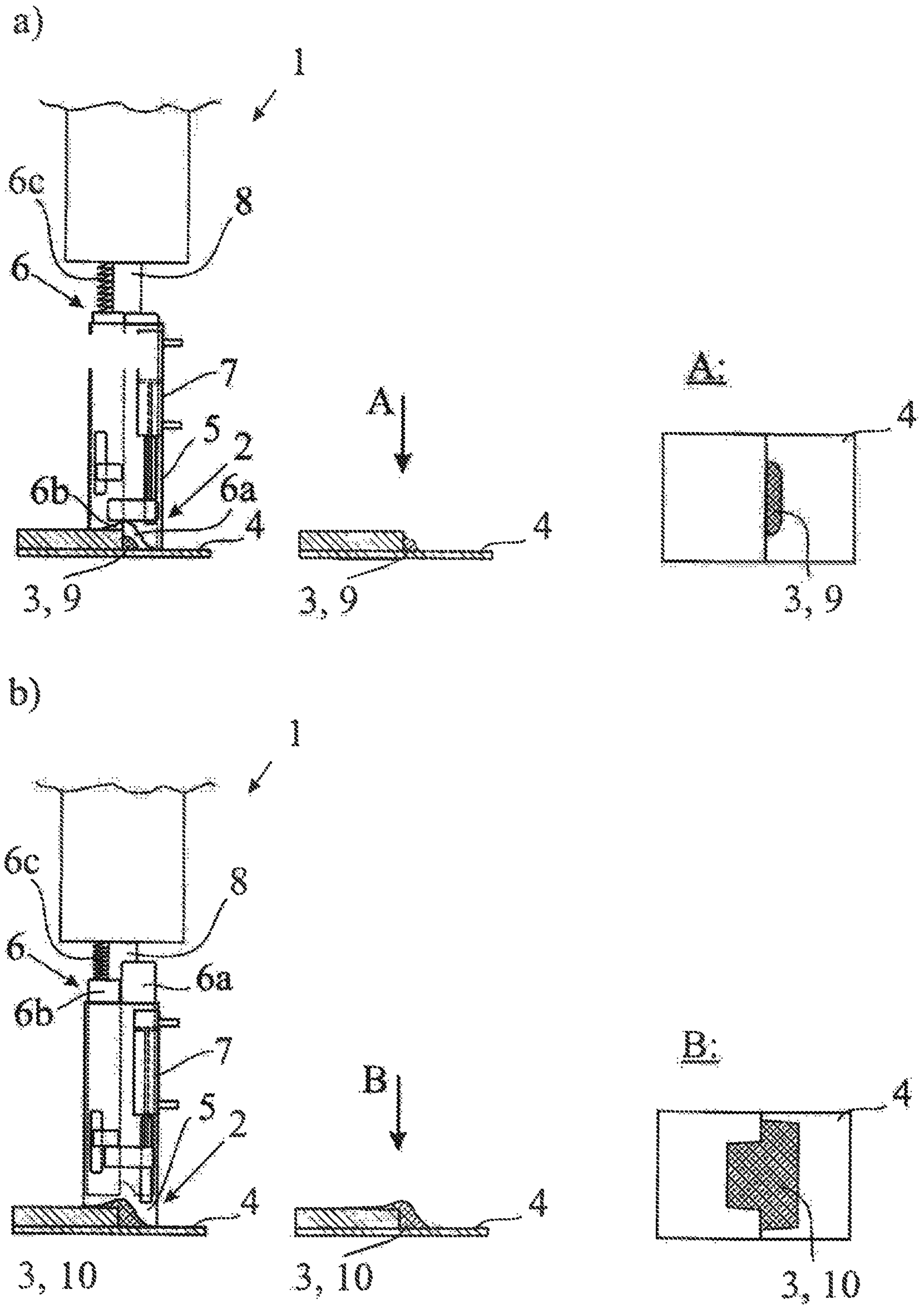
FIG. 5 shows the spreading unit from FIG. 1 in several method steps for the formation of a weld from two layers applied one above the other.

According to the representations in FIG. 5, a method in which the viscous material 3 is applied in two steps, one above the other, to the same region of the component 4 is explained.

Here, a first, smaller weld 9 is firstly applied by means of the second shaping contour in order to ensure the filling of a corner of the component step (FIG. 5*a*). The shape of the first weld is here expediently shaped in the second shaping contour 6, in the present case on the contour segment 6*a*. According to requirements, the shape of the contour segment 6*a* in this region can be configured as in the methods in FIG. 3 and FIG. 4, or an appropriate clearance can be provided.

Below, the spreading unit is then transported back into a starting position and, by means of the first shaping contour 5, a larger, second weld 10 is applied (FIG. 5*b*). The second weld 10 can in particular fully cover the first weld. Expediently, it is applied in good time before the first weld sets.

In just such a multi-stage application of the material, a controlled shaping of the start and/or end regions can be provided, moreover, through the relative movement of the shaping contours 5, 6. Accordingly, the methods according to FIG. 3/FIG. 4 on the one hand, and the dual application according to FIG. 5, can be realized in combination.

Figure 6:
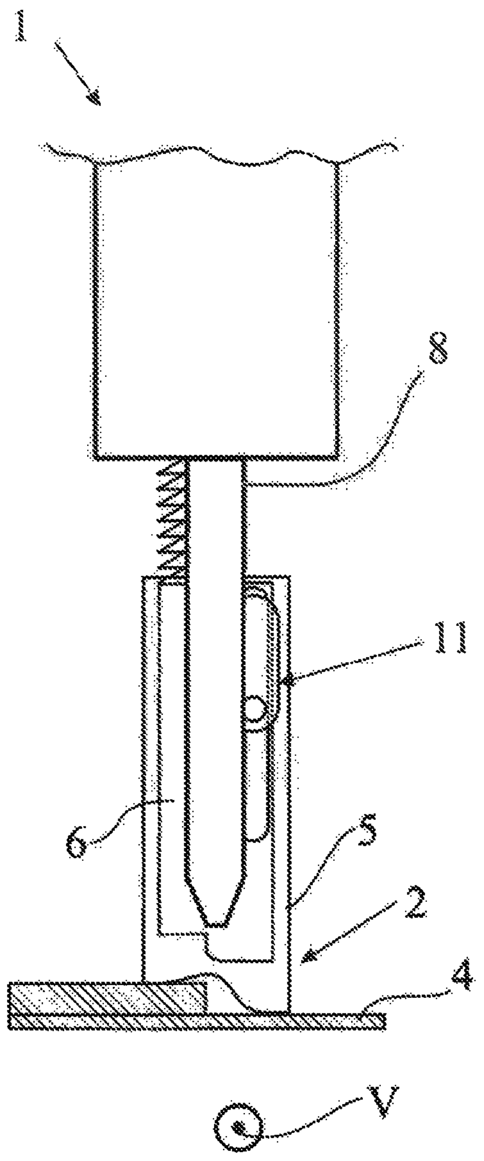
FIG. 6 shows a spreading unit of a second embodiment.

FIG. 6 shows a simplified embodiment, in which the second shaping contour 6 is configured in one piece or is not divided into contour segments. The second shaping contour 6 is connected via a guide 11 to the first shaping contour and is movable relative to the latter by means of an actuator (not represented). Even with a simplified arrangement of this kind, all of the above-described application methods, namely the formation of start and end regions or the two-layered application of a weld, are able to be carried out analogously. Only the early bearing contact of the one contour segment against the component is not available.

Figure 7:
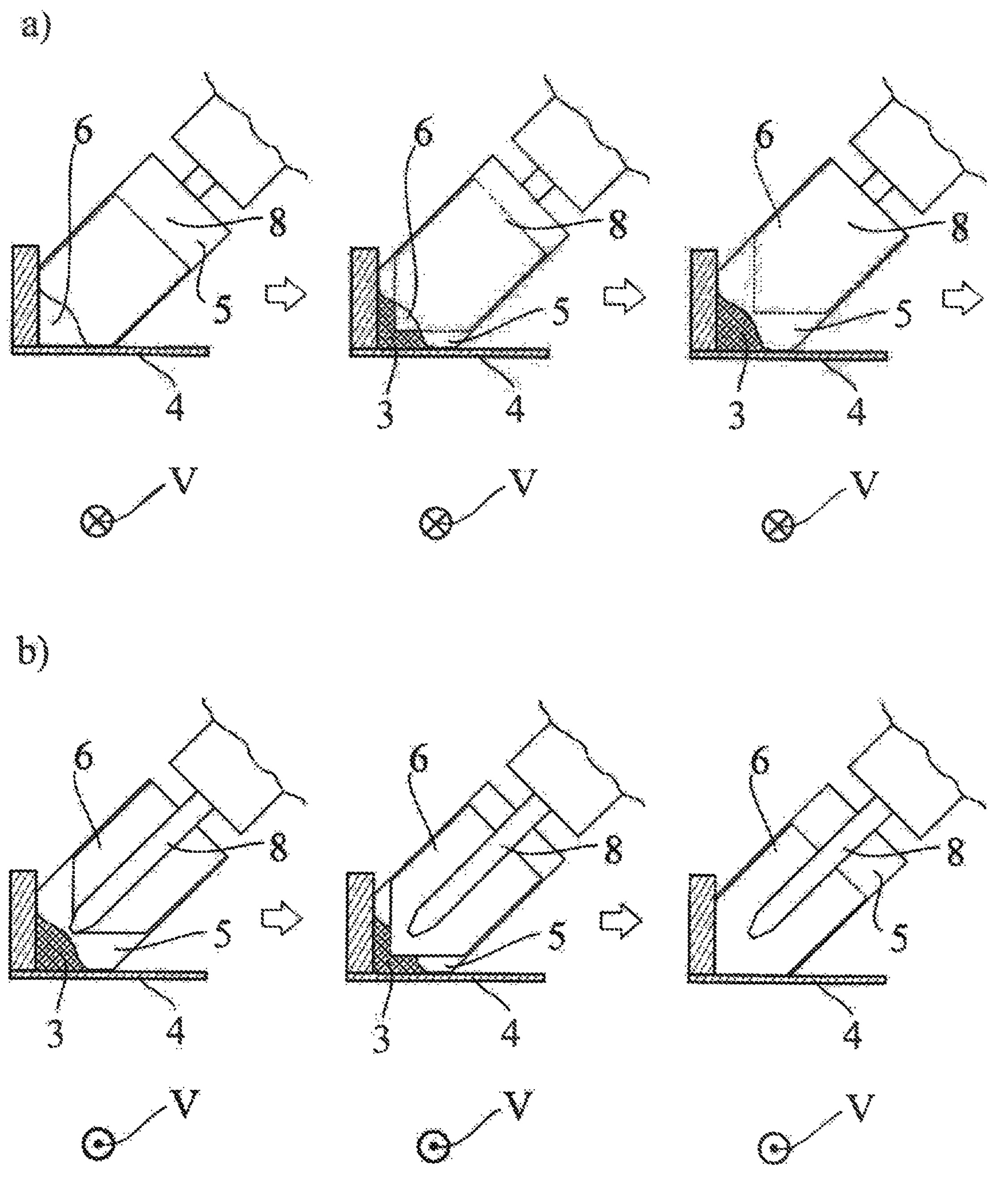
FIG. 7 shows a spreading unit of a third embodiment in several method steps for the application of a fillet weld.

FIG. 7 shows a further embodiment, in which the shaping contours 5, 6 are optimized for the application of a fillet weld. Accordingly, the second shaping contour has an acute-angled shape, which, in the advanced state into the fillet weld, can fully engage in a fillet of the component 4.

Analogously to the above descriptions, in the diagrams of FIG. 7*a* the configuration of a start region of the weld is represented, whilst in the diagrams of FIG. 7*b* the configuration of an end region of the weld is represented.

It should also be pointed out that, here, the first shaping contour 5 and the second shaping contour 6 are of dimensionally stable, here, rigid design, as far as the respective portions which enter into shaping engagement with the viscous material are concerned. These portions can respectively, for instance, be formed of at least one sheet-metal element or at least one elastic, yet dimensionally stable shaping element, in particular wall element.

The invention claimed is:

1. A spreading unit having a shaper for spreading viscous material on a component, wherein the shaper has a first shaping contour for shaping the viscous material in the process of the spreading, wherein at least a second shaping contour of the shaper for shaping the viscous material is configured to be brought by an actuator, in a direction of spreading, into superimposition with the first shaping contour, so that a shape of the shaper is adjustable during an application process, wherein the spreading of the viscous material is realized by a movement of the spreading unit in a direction of application or spreading, wherein the spreading unit comprises a nozzle for the application of the viscous material on the component and wherein the nozzle is arranged at a predefined fixed distance from the shaper, wherein the first and second shaping contours are arranged directly one behind the other in the direction of application or spreading; and wherein the nozzle applies the viscous material on the component such that the nozzle is maintained at the predefined fixed distance from the shaper;

wherein the first shaping contour and the second shaping contour are arranged directly one behind the other in the direction of application or spreading such that the first shaping contour lies behind the second shaping contour in the direction of spreading and is arranged at the predefined fixed distance relative to the nozzle such that the viscous material is configured to precompact or partially harden in a predefined manner on the path from the nozzle to the shaper;

wherein the second shaping contour has a course which substantially corresponds to a cross-section of the component in the region of the spreading;

wherein the second shaping contour comprises at least two contour segments which are separately movable relative to one another, wherein the at least two contour segments are arranged side by side, wherein one of the contour segments is directly connected to the actuator, wherein the other of the contour segments is guided in a separately movable manner, wherein the second contour segment is movable in a resiliently elastic manner in relation to the other of the contour segments; and wherein the viscous material is applied to a joint weld of the component, wherein the joint weld is configured as a stepped weld or a fillet weld.

2. The spreading unit according to claim 1, wherein the component is a structural component of an aircraft.

3. The spreading unit according to claim 1, wherein the second shaping contour at least partially superimposes the first shaping contour at least at the beginning of a material application, wherein the second shaping contour is moved back during the application of a start region.

4. The spreading unit according to claim 1, wherein the second shaping contour at least predominantly opens up the first shaping contour during a continuous material application, wherein the second shaping contour, during the application of an end region, is brought into superimposition with the first shaping contour.

5. The spreading unit according to claim 1, wherein the spreading unit has a sensor for detecting that region of the component that is to be coated.

6. A system for spreading viscous material on a component, wherein the system has a component holder for receiving a component, wherein the system has a spreading unit according to claim 1.

7. A system according to claim 6, wherein the system has a manipulator with the spreading unit as the end effector.

8. The spreading unit according to claim 1, wherein the second shaping contour at least partially superimposes the first shaping contour at least at the beginning of a material application, wherein the second shaping contour is moved back during the application of a start region; and wherein the second shaping contour at least predominantly opens up the first shaping contour during a continuous material application, wherein the second shaping contour, during the application of an end region, is brought into superimposition with the first shaping contour.

9. The spreading unit according to claim 8, wherein the second contour segment is biased via a spring so that it is at all times advanced up to a stop on the first contour segment insofar it does not bear against the component and is moved in relation to the first contour segment out of the stop position.

10. The spreading unit according to claim 1, wherein the distance between the nozzle and the shaper is less than 5 cm.

11. The spreading unit according to claim 1, wherein the first shaping contour and the second shaping contour are arranged directly one behind the other in a direction of application or spreading such that the first shaping contour lies behind the second shaping contour in the direction of spreading and is arranged at a fixed distance relative to the nozzle such that the viscous material exiting the nozzle comes into contact with surrounding air prior being shaped by the shaper such that the viscous material is configured to precompact or partially harden in a predefined manner on the path from the nozzle to the shaper.

* * * * *